United States Patent [19]
Lamballe et al.

[11] Patent Number: 5,787,119
[45] Date of Patent: Jul. 28, 1998

[54] TRANSMISSION SYSTEM FOR DIGITIZED VOICE SIGNALS AND CODER/DECODER CIRCUIT FOR SUCH A SYSTEM

[75] Inventors: Phillippe Lamballe, Elancourt; Brou D. N'Dri, Paris, both of France

[73] Assignee: U.S. Philips Corporation, New York, N.Y.

[21] Appl. No.: 573,851

[22] Filed: Dec. 18, 1995

[30] Foreign Application Priority Data

Dec. 21, 1994 [FR] France .................. 94 15408

[51] Int. Cl.$^6$ .................................. H04B 1/66
[52] U.S. Cl. .......................... 375/240; 395/2.91
[58] Field of Search ................... 375/240, 377, 375/242; 395/2.91; 341/50

[56] References Cited

U.S. PATENT DOCUMENTS 5,455,576 10/1995 Clark, II et al. ................ 341/50

OTHER PUBLICATIONS

Jayant et al., "ding of Speech and Wideband Audio", AT&T Technical Journal, Sep./Oct. 1990, pp. 25–41.

Primary Examiner—Tesfaldet Bocure
Attorney, Agent, or Firm—Leroy Eason

[57] ABSTRACT

The novel transmission system includes a compression/decompression circuit CVA formed by two processors DSP and µP. The first processor DSP is coupled to a combination analog/digital and digital/analog converter CNA-AN for producing and processing voice signals received from and supplied to the subscriber connected to the accesses to such processor. It is this processor DSP that performs the compression and decompression operations. A second processor µP has receive and transmit accesses for the digital signals grouped in frames. To avoid unacceptable delays in processing of the voice signals, signal compression is given priority over signal decompression.

6 Claims, 8 Drawing Sheets

5,787,119

TRANSMISSION SYSTEM FOR DIGITIZED VOICE SIGNALS AND CODER/DECODER CIRCUIT FOR SUCH A SYSTEM

FIELD OF THE INVENTION

The present invention relates to a transmission system for voice signals formed by digital signal frames transmitted between at least a first subscriber and a second subscriber, comprising:

- a transmission medium for transmitting said frames,
- first and second receiving accesses (AR1A, BR1A) for respectively receiving analog voice signals from the first and second subscribers,
- first transmission accesses (AE1A, BE1A) for respectively supplying analog voice signals to the first and second subscribers,
- at least one coder/decoder circuit (CVA) for forming said frames of digital signals received from a subscriber after compression of analog voice signals and for reconstituting, in analog form, analog voice signals to be supplied to a subscriber after decompression of received digital corresponding where to, which coder/decoder circuit has:
  - a frame receiving access for receiving said frames (AR2N),
  - a frame transmission access for producing said frames (AE2N),
  - a compression/decompression circuit (CPRSSA-DECPRSSA) for performing said compression and decompression operations, and
  - control means coupled to said compression/decompression circuit for controlling the compression and the decompression.

The invention likewise relates to a coder/decoder circuit for such a system.

BACKGROUND OF THE INVENTION

The intended application for such a system is the transmission of telephone communications over a digital data network. This transmission of telephone communications can only be effected in compressed form for reasons of transmission rate efficiency.

The compression and decompression processes cause a delay to which the transmission delay on the digital network is added. These delay times added together must not lead to a delay that exceeds 200 ms, otherwise the subscribers experience considerable nuisance in their telephone communications.

This problem of delay, enhanced by the compression and decompression processes, is mentioned in the article: "CODING OF SPEECH AND WIDEBAND AUDIO" by Nikil S., et al; published in the journal AT&T TECHNICAL JOURNAL, October 1990. In this article the only means for minimizing these delays is the use of a good compression/decompression algorithm.

SUMMARY OF THE INVENTION

The invention proposes a system in which measures have been taken to avoid too large a delay time, without taking account of the algorithm used.

Therefore, such a system is characterized in that:

- the compression/decompression circuit is arranged for effecting a compression and a decompression separately, and in that there are provided:

- priority determining means for causing the control means, to control the compression/decompression circuit so that the operation to compress is given priority over the operation to decompress.

Thus, according to the invention, the compression and decompression processes are, in principle, executed by signal processors which are generally sequential processors. Therefore, giving priority to the compression circuit does not result in additional delay.

It should be noted that according to the invention it is possible to utilize only one of these processors to perform the compression and the decompression.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
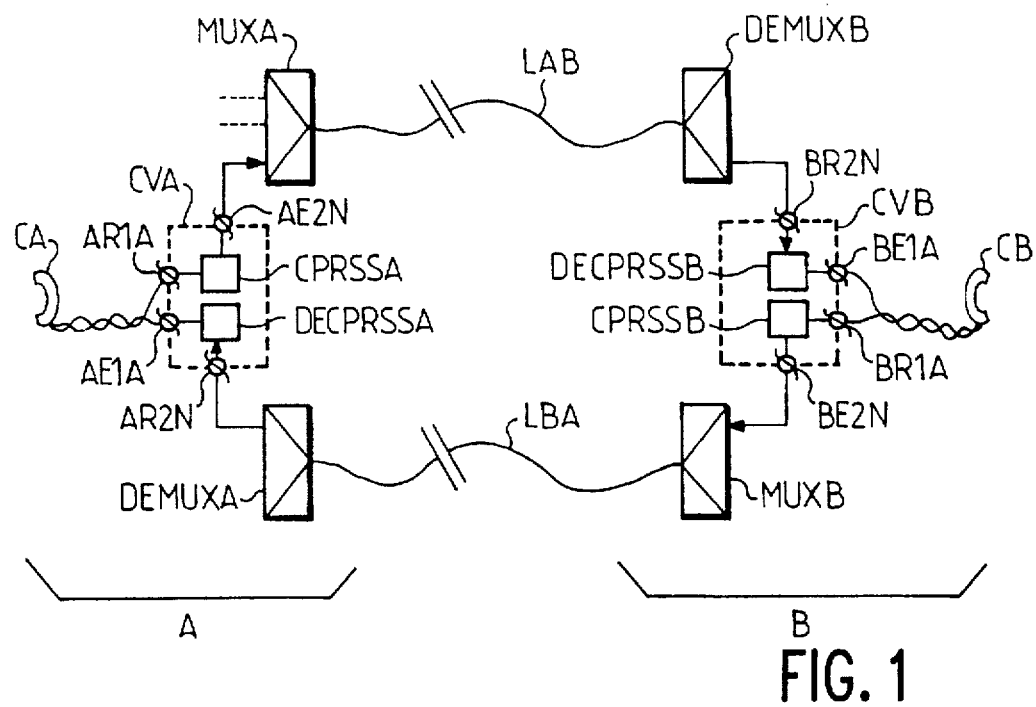
FIG. 1 shows a system according to the invention.

In FIG. 1, reference CA represents the handset of a first subscriber connected to an end A of a transmission system according to the invention. The analog voice signals coming from the handset CA are received at a receiving access AR1A and the voice signals the handset CA is to return are applied to a transmission access AE1A. Reference CB is the reference of the handset of a second subscriber, connected to an end B of said system via accesses BR1A and BE1A. The voice signals of the two subscribers connected to the ends A and B are processed, respectively, by coder/decoder circuits CVA and CVB. These circuits CVA and CVB comprise respectively, compression/decompression circuits formed by a compression unit CPRSSA and a decompression unit DECPRSSA for circuit CVA, and a compression unit CPRSSB and a decompression unit DECPRSSB for circuit CVB. The digital voice signals compressed by the unit CPRSSA are rendered available on an access AE2N of the circuit CVA and the digital voice signals compressed by the unit CPRSSB are rendered available on an access BE2N of the circuit CVB. These voice signals compressed by the units CPRSSA and CPRSSB are transmitted via the network to access BR2N and access AR2N respectively, to be decompressed there. The voice signals of the access AE2N are applied to an input of a multiplexer MUXA which may be connected, via its other inputs, to other data sources of different types from those of the voice signals. A multiplexer MUXB is provided at the end B for the same functions as the multiplexer MUXA. Similarly, the data applied to access AR2N come from the output of a demultiplexer DEMUXA and those applied to access BR2N from the output of a demultiplexer DEMUXB. The multiplexer MUXA and the demultiplexer DEMUXB are connected by a line LAB, while the multiplexer MUXB and the demultiplexer DEMUXA are connected by a line LBA. These lines may be realized in various manners, for example, via a network of the LAN (local area network) or WAN (wide area network) type.

Figure 2:
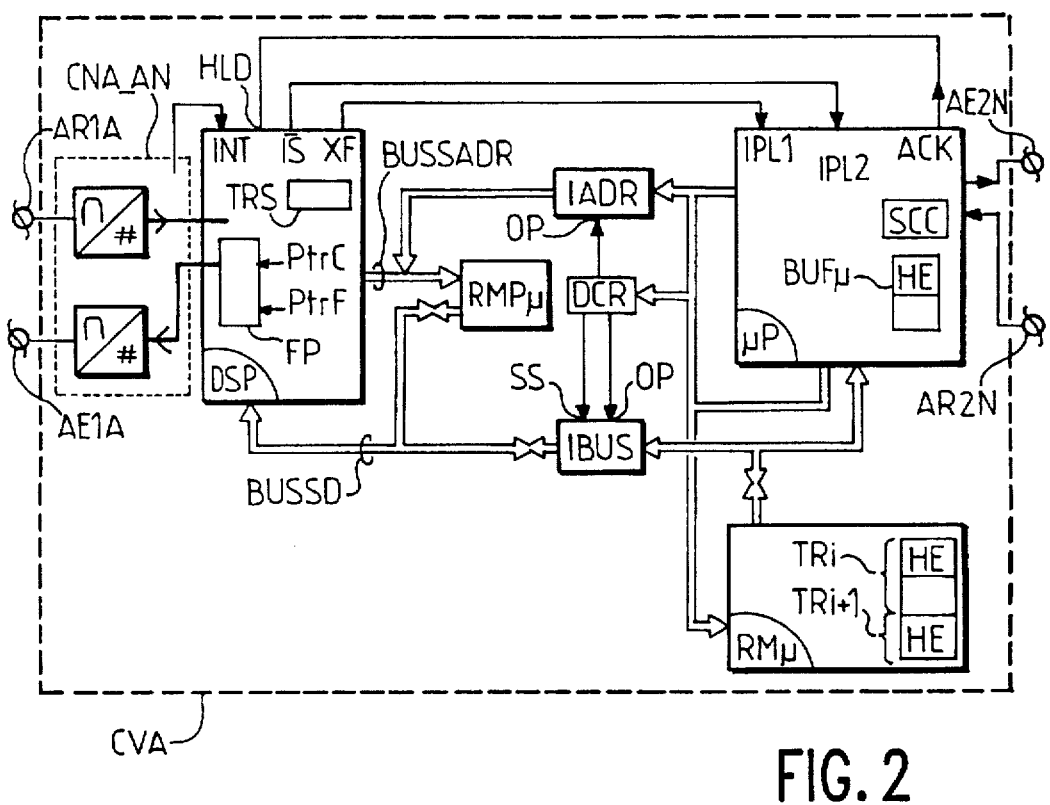
FIG. 2 shows a compression/decompression circuit according to the invention.

In FIG. 2 is shown in a detailed manner the structure of the compression/decompression circuit CVA. Needless to observe that the circuit CVB may advantageously have an identical structure.

This circuit is formed by a converter CNA__AN which performs, on the one hand, the analog/digital conversions and, on the other hand, the digital/analog conversions. This converter is connected by the accesses AR1A and AE1A for analog signals to handset CA. A signal processor DSP processes the data coming from the converter CNA__AN and applies digital data thereto. This processor DSP is mainly assigned to the tasks of compression and decompression according to an algorithm which may be the algorithm described in said article. This processor DSP has an input HLD for receiving acknowledgement signals, outputs XF and IS for sending interrupt signals, and an input INT for receiving interrupt signals. The processor DSP communicates with the exterior, notably by two buses BUSSADR and BUSSD which relate respectively, to the transmission of address codes and to the transmission and reception of data. A management processor µP manages the transmission of frames to access AE2N and the reception of frames on access AR2N. A memory RMPµ notably serves as a buffer memory between the processors DSP and µP for exchanging compressed samples. This memory is accessible both to the processor DSP and to the processor µP. Therefore, access interfaces IADR and IDUS are used which are controlled in response to address codes of the processor µP via a logic decoder circuit DCR. More particularly a memory RMµ is assigned to the management of a frame queue of compressed digital signals that come from access AR2N. Within the scope of the described example, the converter CNA__AN is a TLC320AC01 converter manufactured by TEXAS INSTRUMENTS, the processor DSP is a TMS320C5x processor also manufactured by TEXAS INSTRUMENTS and the processor, µP is an MC68302 processor manufactured by MOTOROLA. Various specific features of these components are used. For example, the memory BUFµ is used for storing the signals coming from port SCC of the processor MC68302, thus from access AR2N. The processor µP may be interrupted by interrupt signals applied to its inputs IPL1 and IPL2. These signals come from the outputs XF and IS of processor DSP. Also a stack memory FP will be used which is located, in this example, in the processor DSP. This memory FP, which contains digital samples which are the result of the compression, is indexed by two pointers: the pointer PtrC which points to a sample to be applied to the converter CNA__AN, and a pointer PtrF which points to the end or bottom of this memory. The end of this memory is defined by the value #finFP. A buffer memory TRS located in the processor DSP stores the samples coming from the converter. Once the buffer TRS is full, that is to say, when it contains N samples of K bits (for example: N=160, K=14 bits), these N samples are compressed to form a frame that is accessible to µP in memory FMPµ. This frame comprises a header HEE followed by compressed data. The header HEE notably includes a silence indicator bit SIL. Conversely, the DSP receives from µP a frame comprising a header HER followed by compressed data. The header HER notably comprises:

an information signal OIE signalling a request to insert a dummy sample for the converter CNA__AN, an information signal OSE signalling a request to suppress a sample for the converter CN__AN, an information signal EOA signalling that the insertions or suppressions of samples are to take place or not in periods of silence.

These various information signals are established or updated during processes which will be explained in the following of the present exposé.

The operation of such a coder/decoder circuit is explained by the following flow charts.

1.—Flow charts controlling the operation of the signal processor DSP

Figure 3:
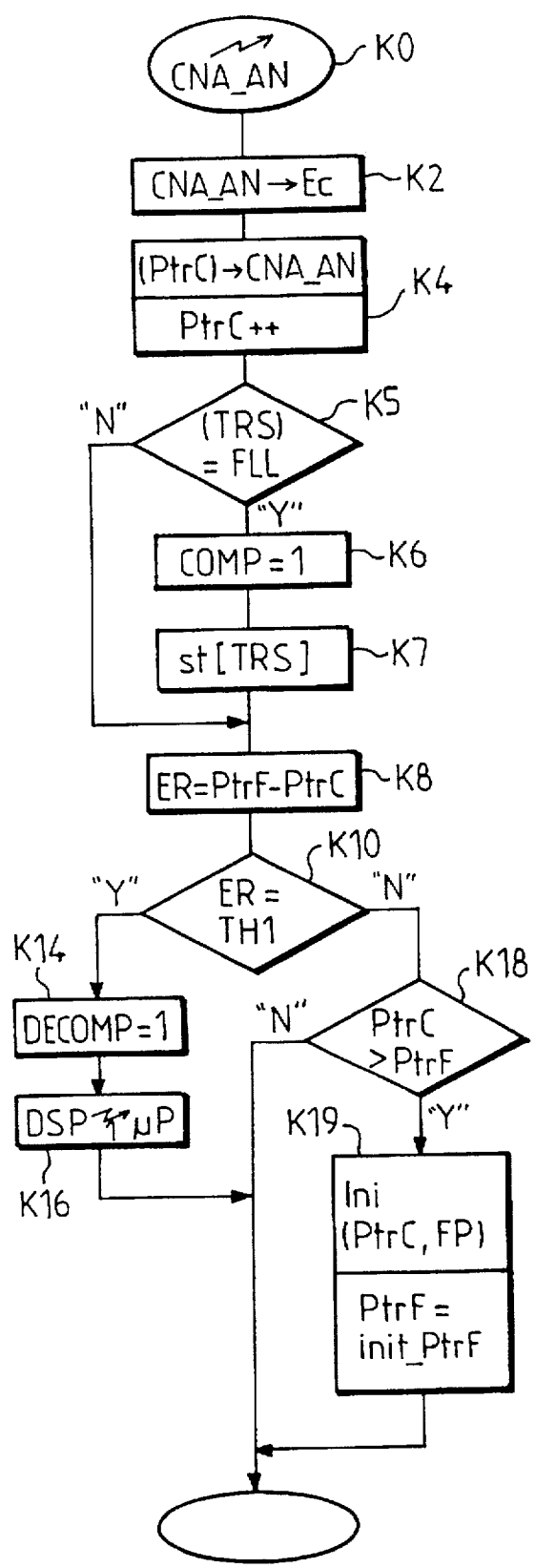
FIGS. 3, 4, 5, 6 and 7 show flow charts which explain the operation of a first processor which forms part of the circuit shown in FIG. 2, FIGS. 8, 9, 10 and 11 show flow charts which explain the operation of a second processor which forms part of the circuit shown in FIG. 2.

The flow chart of FIG. 3 represents an interrupt routine which is triggered by an interrupt that appears at a fixed rate. The appearance of this interrupt which, in the scope of the described example, appears every 125 µs, is fixed by the rate of operation of the converter CNA__AN. This is denoted in box K0. A first task carried out by this interrupt routine consists of reading a sample Ec formed by the converter CNA__AN (box K2) and writing this sample in memory TRS. A second task, indicated in box K4, consists of supplying to the converter CNA__AN a sample coming from memory FP and a location defined by the pointer PtrC which is then incremented by unity. Box K5 shows a test to establish whether the memory TRS is full or not. If it is full, box K6 is proceeded to where a variable COMP is set to "1". In consequence, as will be seen in the following of this exposé, the compression algorithm is triggered by the processor DSP. Then, as indicated in box K7, memory TRS is re-initialized, its pointer is reset to its initial position, so that with the next operation relating thereto the first location is used. In box K8, which follows box K7, the degree of filling ER of the stack memory FP is examined. This is simply calculated by subtracting said pointers PtrC and PtrF. This degree is tested in box K10. In order that this degree is stated satisfactorily, this difference is to be equal to a value TH1. This value corresponds to the maximum time necessary for the processor DSP to decompress a frame, knowing that the compression process has priority.

If there is estimated that the tested degree in box K10 is satisfactory, a variable DECOMP is set to "1", which variable authorizes the decompression process (box K14). Then, as indicated in box K16, an interrupt on terminal IPLI of the processor µP is provided, so that other compressed information signals are supplied to the processor DSP, as will be described hereinafter.

If this degree is not satisfactory, first the relative values of the pointers PtrC and PtrF are tested in box K18. If the value of PtrC is smaller than that of PtrF, no measure will be taken and the interrupt routine is terminated. If the value of PtrC is higher than that of PtrF, box K19 is proceeded to re-initialize the various pointers PtrC, PtrF and memory FP. Notably pointer PtrF is influenced by the value INIT__PtrF.

Figure 4:
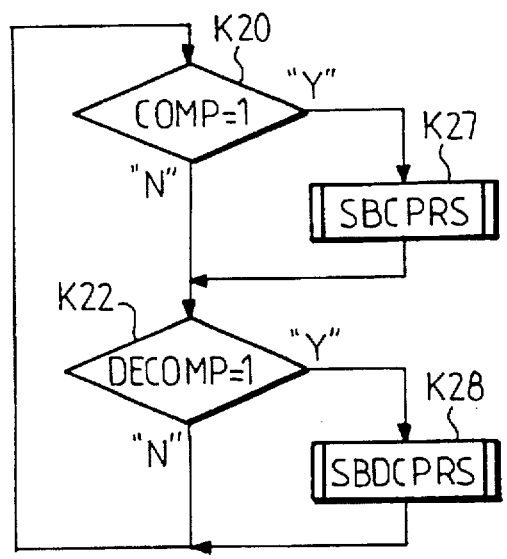
Figure 5:
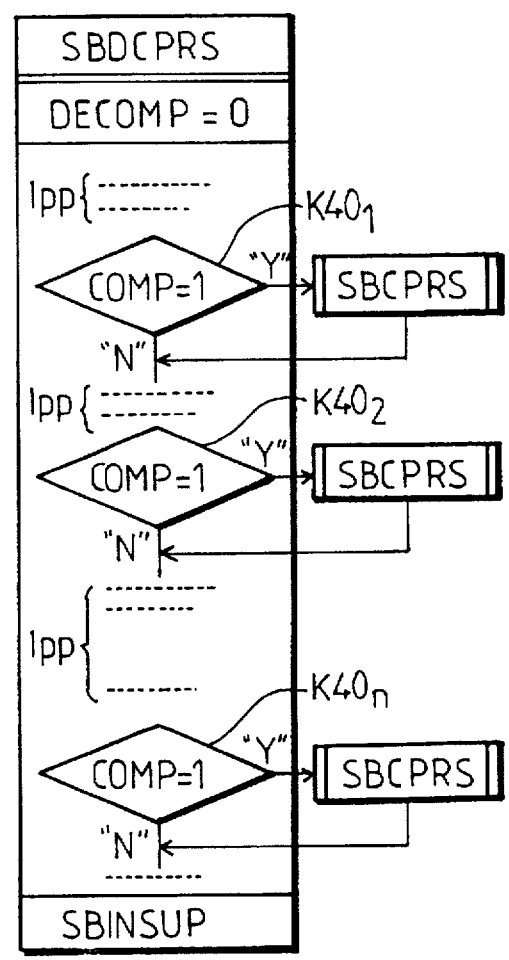

FIG. 4 is the flow chart showing the whole operation of the processor DSP; this is a closed loop routine. It comprises, in essence, two tests indicated in boxes K20 and K22, respectively. The first one tests the value of the variable COMP already mentioned, and the second one the value of the variable DECOMP. If COMP has the value "1", the subroutine SBCPRS relating to the compression (box K27) is carried out. If DECOMP has the value "1", the subroutine SBDCPRS relating to the decompression (box K28) is carried out. It will be evident that such a routine undergoes the interrupts of the converter CNA__AN and that notably the values COMP and DECOMP may change. Thus, in the subroutine SBDCPRS, shown in FIG. 5, there is periodically examined whether the value COMP has the value "1"(see boxes $K40_1, K40_2, \ldots, K40_n$). If the value "1" is present, as it were the subroutine SBDCPRS is interrupted according to the invention, so that the execution of the subroutine SBCPRS has priority of execution. The dotted lines "1pp" shown in this FIG. 5 are routine lines relating to decompression which are not explained, because they do not come back within the scope of the invention. But these lines may be established based upon the article mentioned above.

Figure 6:
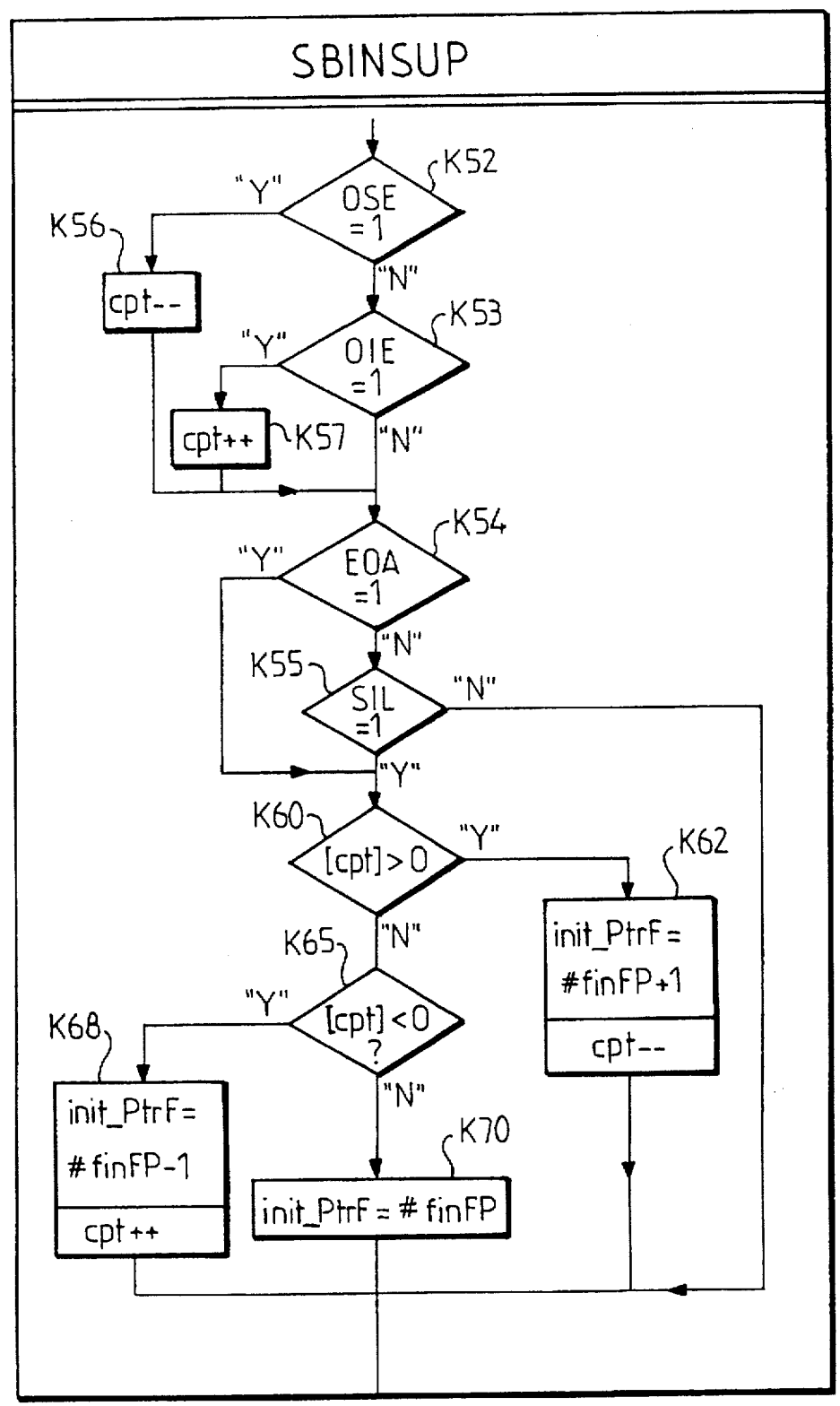

The subroutine SBDCPRS is terminated by a call for a subroutine SBINSUP, shown in FIG. 6.

This subroutine commences with the analysis of the header of the frame of compressed digital voice signals stored in memory RMPμ. The boxes K52, K53 and K54, which are consecutive, indicate tests to find whether the above-mentioned information signals OSE, OIE and EOA are equal to "1". If OSE has the value "1", a counter cpt is decremented by unity (box K56). It will be evident that such a counter has initially been set to zero, prior to a communication. If OIE has the value "1", this counter cpt is incremented by unity (box K57). If the order EOA has the value "1", a test is made forthwith in box K60 of the contents of counter cpt. If they are positive, a sample is inserted. For this purpose, various actions are taken: the initialization value of the pointer PtrF (box K62) is incremented so as to increase the size of the newly decompressed frame (FIG. 5) and thus the buffer memory FP, by making this memory go from N to N+1 samples, which results in a delay of frame exchanges between the processors DSP and μP (boxes K8, K10, K14 and K16), and the counter cpt is decremented by unity. If the test indicated in box K60 is negative, there is then tested whether the contents of the counter cpt are negative (box K65). If they are negative, the last sample will be suppressed (box K68). Therefore, the initial value #finFP of the pointer PtrF: Init_PtrF is decremented by unity to diminish the size of the newly decompressed frame, and, consequently, the size of the buffer memory FP by making this memory go from N to N−1 samples, which results in an acceleration of frame exchanges between the processors DSP and μp (boxes K8, K10, K14 and K16), and the counter cpt is incremented by unity. Subsequently, the pointer PtrC is incremented by unity, so that one sample will be skipped when it is read as indicated in box K4 of FIG. 3. If the test of box K65 is negative, this means that the value of "cpt" is "0", box K70 is proceeded to where the initial value of PtrF corresponds to its nominal value. If the code EOA has not been sent, box K55 is proceeded to know whether silent samples are present. If there is no silence, no action will be taken. If silence is detected, box K60 will be proceeded to.

Figure 7:
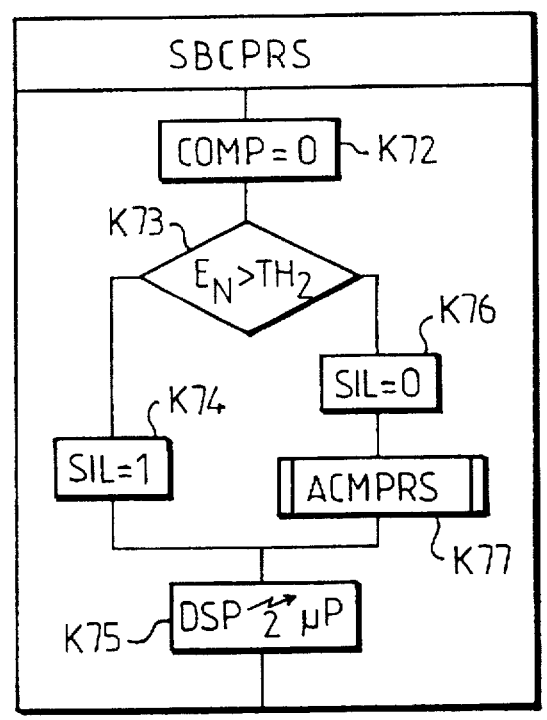

FIG. 7 explains the compression subroutine SBCPRS. The first task carried out in this subroutine is shown in box K72. It consists of setting the variable COMP to zero. Then the mean energy EN of the samples to be compressed is tested. If this energy is smaller than a certain value TH2, these samples are considered to represent silence and box K74 is proceeded to, where the variable SIL is set to "1" to indicate this fact and the subroutine is terminated while going through box K75, which implies that an interrupt for the processor μP is triggered by a signal applied to the input IPL2. If there are no silence samples, the variable SIL is set to zero, box K76, and box K77 is proceeded to, which indicates that the compression subroutine ACMPRS is triggered before box K75 is proceeded to. This compression subroutine can be set up by means of the teaching of said article.

2. Flow charts controlling the operation of the management processor μP.

Figure 8:
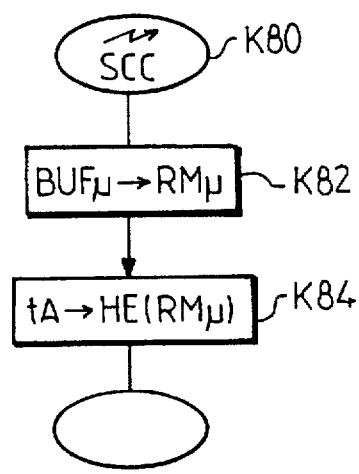

FIG. 8 shows a first flow chart explaining the operation of the processor μP. This flow chart relates to an interrupt routine triggered at the serial port of the processor. This processor actually comprises a system for managing a serial line which is connected to the access AR2N. It is the access that receives the frames of compressed digital signals. Once the buffer memory BUFPμ assigned to this serial port is full, it contains a frame formed by a compressed speech packet, address and control octets. An interrupt is triggered inside the processor μP (box K80). This interrupt triggers a first action which consists of releasing this memory BUFμ by transferring its contents to the memory RMμ (box K82). A second action is indicated in box K84, where a date "TA" is assigned to the frame thus transferred. This date is inserted into the frame header HE.

Figure 9:
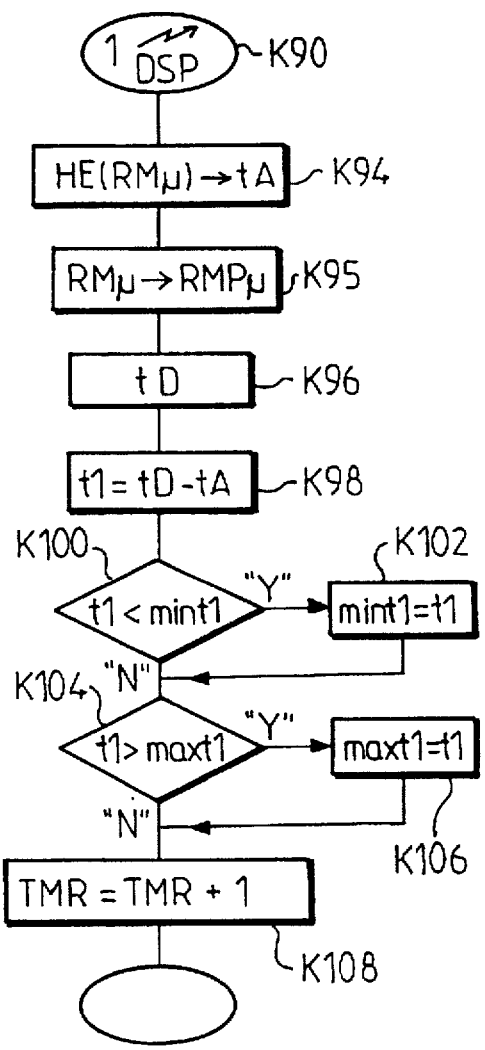

FIG. 9 shows a second flow chart explaining the operation of the processor μP. This flow chart relates to a first receiving interrupt routine triggered by the processor DSP via a signal applied to the input IPL1 (box K16 in FIG. 3). As indicated in box K94, the header HE is removed from the oldest frame and the frame is transferred to the memory RMPμ (box K95). Then a date "tD" linked with this previous action (box K96) is determined. Box K98, which follows, explains a duration "t1" which is the difference between the dates "tA" and "tD". In box K100 is indicated a comparison of this value t1 with a magnitude mint1 which has been initialized at a considerable value while the communication was being established. If t1 is smaller than mint1, mint1 assumes a value of t1 (box K102). Then, box K104 is proceeded to, where the value t1 is tested relative to a value maxt1, which latter value has been initialized at a small value during the initialization. If t1 is greater than the value maxt1, maxt1 assumes the value t1 (box K106). Box K108, which terminates this interrupt routine, increments a timer variable TMR by unity.

Figure 10:
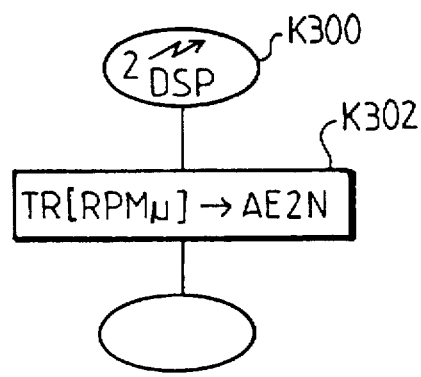

FIG. 10 shows a third flow chart explaining the operation of processor μP. This flow chart relates to an interrupt routine triggered on the line IPL2 by the DSP at the end of the compression process. This interrupt, indicated in box K300, meanwhile causes the transmission by line LAB through access AE2N of a frame of compressed signals which was contained in an area TR of memory RMPμ (box K302).

Figure 11:
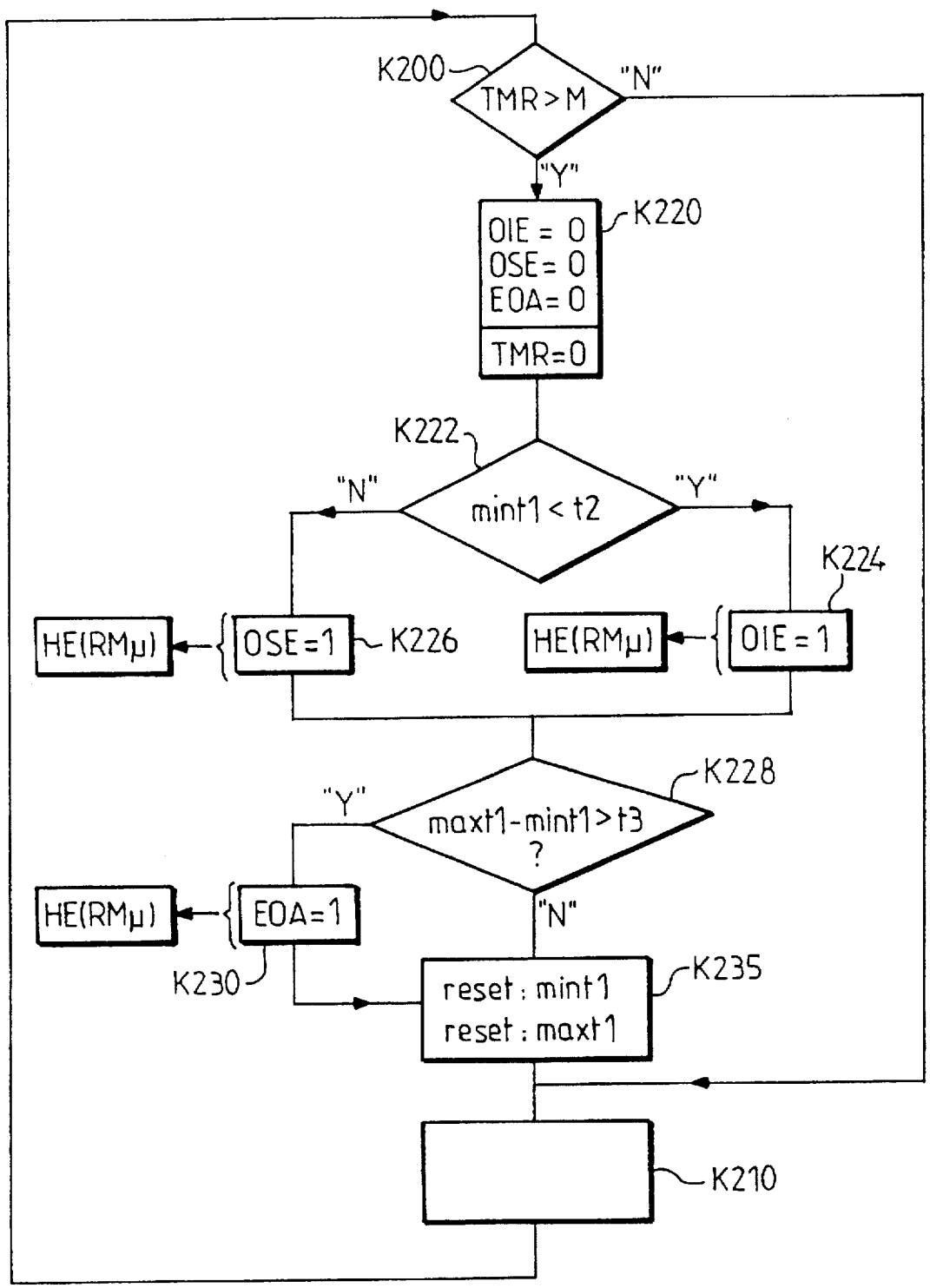

FIG. 11 is a flow chart showing the whole operation of the processor μP, which is a closed loop routine.

This routine begins with box K200 where the value of the timer TMR is tested relative to frame value M transmitted during a period of time of, for example, 10 s (1/20 ms*10 s=500 frames). M represents the number of frames to be expected for the management of the frequency offset (Δ) between the cards CVA and CVB. The value of M is bounded by the maximum of the offset and by the maximum tolerated flutter rate (τ). More precisely, M is chosen so that:

$\Delta < (M*N)^{-1} < \tau$, where N is the number of samples per frame. If this value is not reached, no action is taken and box K210 is proceeded to which represents various tasks the processor has to carry out and which need not be explained in detail, because they do not form part of the invention. If the period of time has elapsed, box K220 is proceeded to, which indicates the initialization at zero of various values OIE, OSE, EOA and TMR. Then box K222 is proceeded to, where the value mint1 is tested against the value t2 which is a minimum safety margin, so that the receiving stack of the network frames, RMμ, is never empty when processor DSP requests for a decompression. This margin has been selected to be close to 5 ms. If the value mint1 is smaller than this value t2, it is understood to mean that the stack RMμ empties itself and that it is suitable to add more samples. Therefore, the value OIE=1 is put in the header of the frame, which is indicated in box K224. If the value mint1 exceeds the value t2, it is suitable to take the reverse measure, that is to say, to suppress samples. Box K226 shows that the variable OSE in the header is set to the value "1". Box K228, which follows, is a measurement and a test of the jitter deviation. This is obtained by computing the difference between maxt1 and mint1. If this difference is too large and greater than a value t3, which is of the order of M divided by the sampling frequency of about 5 ms, more draconian measures are taken. These measures consist of setting the variable EOA in the header to "1" (box K230), so that the processor DSP inserts a sample in all the frames even if they relate to silence. After these measures, box K235 is proceeded to, which indicates a reinitialization of the values mint1 and maxt1.

Figure 12:
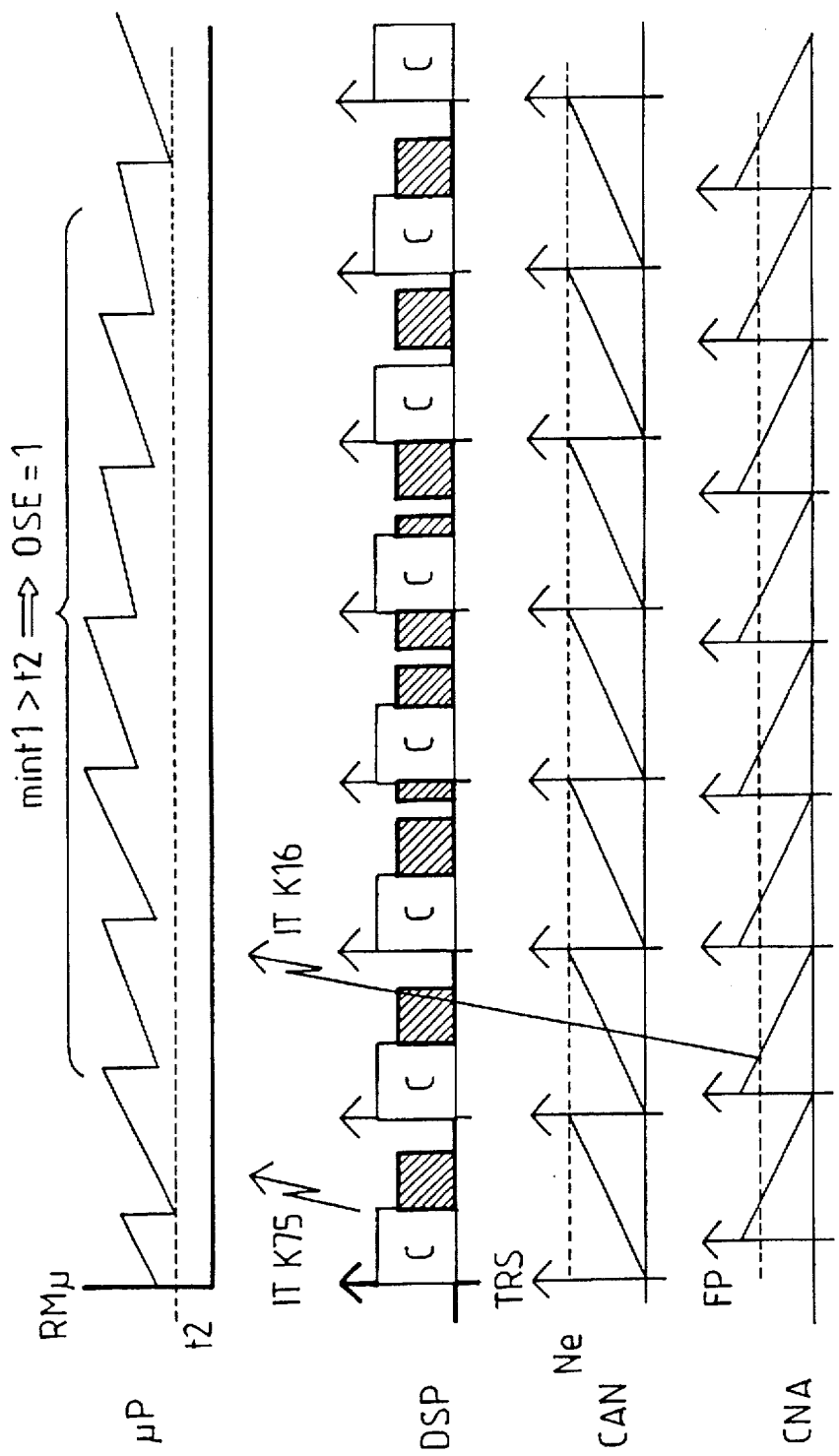
FIG. 12 is a time diagram intended to summarize the operation of the coder/decoder circuit according to the invention.

FIG. 12 summarizes the operation of the coder/decoder circuit according to the invention. This FIG. 12 shows the filling of memory TRS by the CAN which controls the compression of a frame by the DSP. This compression is terminated by an interrupt (cf. K75, FIG. 7), transmitted by the DSP and which permits the µP of reading RMPµ and sending the compressed frame onto the network via the access AE2N. There should be observed that the compression process has priority over the decompression process and may even interrupt the decompression process. The decompression process is triggered (K14) at the same time as IT (K16) when the filling rate of memory FP reaches the threshold TH1 (see FIG. 3). Line RMµ of FIG. 12 shows the degree of filling of memory RMµ. At interrupt K16, the µP executes the subroutine of FIG. 9 and thus writes a compressed frame in memory RMPµ, notably accompanied by a command OIE/OSE. FIG. 12 illustrates an example for which memory RMµ receives too many data from the network compared with the data it transmits to the DSP. Thus, commands OSE are sent to the DSP and, therefore, certain frames received by the DNA are reduced by one sample. Thus the decompressions may be effected at a higher frame rate. In an opposite case, where the memory RMµ would not receive enough data from the network, commands OIE would then be sent to the DSP.

We claim:

1. Transmission system for voice signals formed by digital signal frames transmitted between at least a first subscriber and a second subscriber, comprising:

a transmission medium for transmitting said frames, first and second receiving accesses (AR1A, BR1A) for respectively receiving analog voice signals from the first and second subscribers, first and second transmission accesses (AE1A, BE1A) for respectively supplying analog voice signals to the first and second subscribers, at least one coder/decoder circuit (CVA) for forming frames of digital signals after compression of analog voice signals received from a subscriber and for reconstituting, in analog form, analog voice signals to be supplied to said subscriber after decompression of corresponding received digital frames, which coder/decoder circuit includes:

a frame receiving access for receiving said frames (AR2N), a frame transmission access for producing said frames (AE2N), a compression/decompression circuit (CPRSSA-DECPRSSA) for performing said compression and decompression operations, and control means coupled to said compression/decompression circuit for controlling the compression and decompression operations thereof;

which system is characterized in that:

the compression/decompression circuit is arranged for effecting a compression and a decompression separately, and the system further comprises priority determining means for causing the control means to control the compression/decompression circuit so that the operation to compress is given priority over the operation to decompress.

2. Transmission system as claimed in claim 1, characterized in that the coder/decoder circuit (CVA) comprises:

a buffer memory (TRS) for storing at least one frame of digital samples which results from the compression, and first management means for producing said stored frame on said frame transmission access the moment the frame is processed by the compression/decompression circuit.

3. Transmission system as claimed in claim 2, characterized in that the coder/decoder circuit (CVA) further comprises: second management means for applying a frame received on the receiving access (AR2N) to the compression/decompression circuit to minimize the transit time.

4. Transmission system as claimed in claim 1, characterized in that the compression/decompression circuit comprises:

a buffer memory (FP) arranged as a queue for containing digital samples which are the result of the decompression, a digital/analog converter for producing said analog voice signals based upon said digital samples, and third management means for carrying out a request for decompression when said buffer memory is estimated to be too empty.

5. Transmission system as claimed in claim 1, characterized in that the coder/decoder circuit (CVA) comprises: means for compensating for jitter that has been caused by the transmission medium.

6. Coder/decoder circuit (CVA) for coding analog voice signals into digital form and for decoding digital voice signals into analog form, and which is suitable for use in a system as claimed in claim 1, which circuit includes:

a frame-receiving access for receiving said frames (AR2N), a frame transmission access for producing said frames (AE2N), a compression/decompression circuit (CPRSSA-DECPRSSA) for performing said compression and decompression operations, and control means coupled to said compression/decompression circuit for controlling the compression and the decompression;

which system is characterized in that:

the compression/decompression circuit is arranged for sequentially effecting a compression and a decompression, and the system further comprises priority determining means for causing the control means to control the compression/decompression circuit so that the operation to compress is given priority over the operation to decompress.

* * * * *